United States Patent [19]

Kawanabe et al.

[11] Patent Number: 5,012,063

[45] Date of Patent: Apr. 30, 1991

[54] TAPER MACHINING DEVICE IN WIRE-CUT ELECTRICAL DISCHARGE APPARATUS

[75] Inventors: Tasuku Kawanabe; Juzo Kuriyama, both of Nagoya, Japan

[73] Assignee: Brother Kogyo Kabushiki Kaisha, Aichi, Japan

[21] Appl. No.: 413,684

[22] Filed: Sep. 28, 1989

[30] Foreign Application Priority Data

Oct. 5, 1988 [JP]  Japan .............................. 63-251403

[51] Int. Cl.⁵ .............................................. B23H 7/06
[52] U.S. Cl. .............................. 219/69.12; 219/69.13
[58] Field of Search ............... 219/69.12, 69.2, 69.17, 219/69.13; 364/474.04

[56] References Cited

U.S. PATENT DOCUMENTS

| | | | |
|---|---|---|---|
| 3,731,044 | 5/1973 | Ullmann et al. | 219/69.12 |
| 3,849,624 | 11/1974 | Dulebohn et al. | 219/69.12 |
| 4,431,896 | 2/1984 | Lodetti | 219/69.12 |
| 4,678,976 | 7/1987 | Inoue | 219/69.17 |
| 4,736,086 | 4/1988 | Obara | 219/69.12 |
| 4,740,667 | 4/1988 | Obara | 219/69.14 |
| 4,751,362 | 6/1988 | Girardin | 219/69.12 |

FOREIGN PATENT DOCUMENTS

| | | | |
|---|---|---|---|
| 3524377 | 1/1987 | Fed. Rep. of Germany | 219/69.12 |
| 63-39732 | 2/1988 | Japan | 219/69.12 |

*Primary Examiner*—Geoffrey S. Evans
*Attorney, Agent, or Firm*—Oliff & Berridge

[57] ABSTRACT

A taper machining device in a wire-cut electrical machining apparatus. The taper machining device includes an upper wire guide and a lower wire guide defining upper and lower bending points of a wire electrode. The wire electrode slantingly extends under tension between the upper and lower wire guides. One of the upper and lower bending points serves as a reference point and the remaining bending point is movable in a horizontal plane. The movable range of the remaining bending point is understood as being within a circle located at the bottom of a conical body whose apex is coincident with the bending point which serves as the reference point. The conical body has an apical angle twice as large as an allowable maximum inclination angle of the wire electrode.

4 Claims, 4 Drawing Sheets

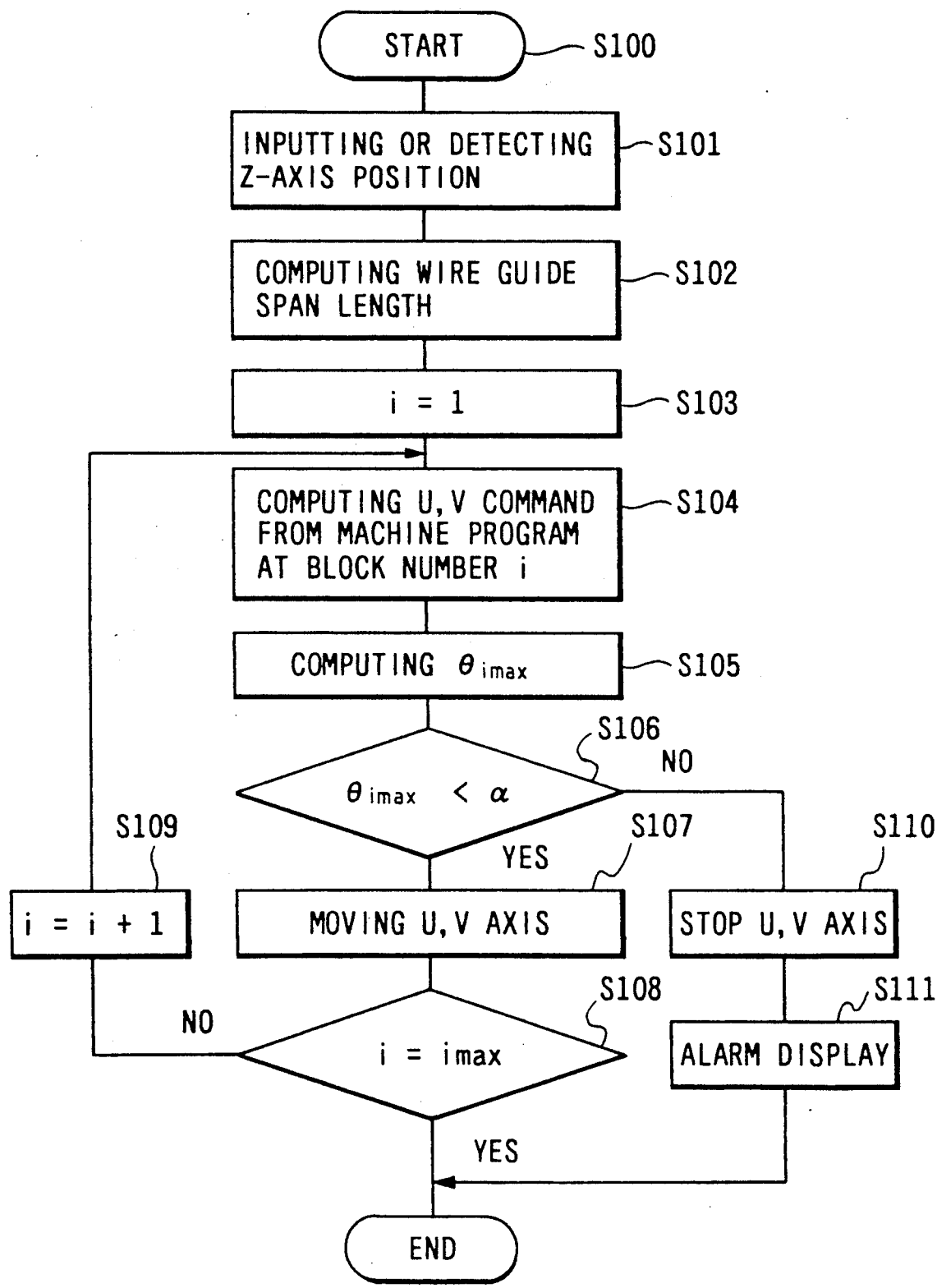

TAPER MACHINING DEVICE IN WIRE-CUT ELECTRICAL DISCHARGE APPARATUS

BACKGROUND OF THE INVENTION

The present invention relates to a taper machining device in a wire-cut electrical discharge apparatus. More particularly, the invention relates to the taper machining device in which a wire electrode is obliquely suspended and has upper and lower bending points, one of the upper and lower bending points serving as a reference vertex and remaining one of the lower and upper bending points being relatively movable within an imaginary conical body having a predetermined apical angle and whose vertex is given by the one of the upper and lower bending points.

In a conventional wire electrical discharge machining apparatus, overrunning or overstroke of a working table is detected by limit switches provided at maximum and allowable moving ends of movable shafts connected to the working table which shafts move the latter in X and Y directions in a horizontal plane. Upon actuation of the limit switches, overrunning or overstoke of the table can be detected.

In a taper machining by means of the wire electrical disharge machining apparatus, a wire electrode is slantingly supported by upper and lower wire electrode guides (hereinafter simply referred to as "wire guide"). One of the wire guides is stationarily supported, whereas the other wire guide is provided movable in a horizontal plane, so that orientation of the wire electrode is changed for performing taper machining. In this machining, overstroke or overrunning of the other wire guide is detected by a limit switch provided at an allowable distal moving end portion.

A vertical distance between the upper and lower wire guides is varried depending on a thickness of a workpiece to be machined. Therefore, as shown in FIG. 5(a), in case of the oblique orientation of the wire electrode 11 for machining the workpiece, even if relative displacement $U_X$ of the upper wire guide $12a_1$ and the lower wire guide $13a$ is equal to that of the upper wire guide $12a_2$ and the lower wire guide $13a$, inclination angle $\theta_1$ relative to a vertical line L of the wire 11(1) is much different from that of the angle $\theta_2$ of the wire 11(2), since the vertical distance $H_1$ between the upper and lower wire guides $12a_1$ and $13a$ is much different from the distance $H_2$ between the upper and lower wire guides $12a_2$ and $13a$.

If the overstroke of the wire guide is intended to be detected only by relying on the relative horizontal displacement of the wire guides, the wire electrode 11 may be excessively inclined in excess of a tolerable inclination in spite of the fact that the overstroke of the wire guide has not yet been detected. As a result, interference may occur between the wire electrode mass and nozzles 24(1), 24(2) and 25 which eject machining liquid.

Further, the one of the upper and lower wire guides is provided movable, for example, the upper wire guide is movable in a horizontal plane defined by U and V axes extending in parallel with X and Y axis along which a working table moves. With the structure, if overstroke is intended to be detected by providing limit switches at distal moving end portions of the U and V axes, overstroke may not be accurately detected at hatching zones shown in FIG. 5(b). More specifically, even though the wire electrode line $L_2$ has an inclination angle exceeding the tolerable angle $\alpha$, in light of a three dimensional aspect, such over-inclination cannot be detected in the U and V axes since the line $L_2$ is projected as if it is positioned within the tolerable inclination angle (for example, projection image of the line $L_2$ ($U_3$, $V_2$) becomes coincident with the projection image of the line $L_3$ ($U_3$, $V_3$) in U axis).

Further, at the time of the electrical discharge, the wire electrode is suspended by the upper and lower wire guides under tension, and is pulledly drawn out in slide contact with the wire guides. Therefore, frictional force is generated at the sliding portion. If the inclination angle of the wire electrode becomes large, the frictional force is also increased, to thereby increase tension applied to the wire. Consequently, the wire electrode may be cut.

To avoid this drawback, the inclination angle of the wire electrode must be within a tolerable range for performing the taper machining. However, vertical distance between the upper and lower wire guides must be changed in accordance with the thickness of the workpiece as described above. Accordingly, for the detection of the overstroke, resetting is required to determine the maximum and allowable moving end position of the wire guide taking the tolerable inclination of the wire electrode into consideration.

Furthermore, in case of the wire-cut machining for producing a product having intricate configuration by moving the working table mounting the workpiece thereon in one moving locus and by moving the wire guide in another moving locus, it would be almost impossible to suitably determine the allowable maximum moving end position in order to detect the overstroke of the wire guide.

SUMMARY OF THE INVENTION

It is therefore, an object of the present invention to overcome the above described drawbacks and to provide an improved taper machining device in a wire electrical discharge machining apparatus.

Another object of the invention is to provide such improved taper machining device in which a wire electrode is obliquely supported at upper and lower bending points, and one of the upper and lower bending points serving as a reference vertex and remaining one of the lower and upper bending points being movable relative to the one bending point within an imaginary conical body having a predetermined apical angle and whose vertex is given by the one of the upper and lower bending points.

Still another object of the invention is to provide such device capable of automatically determining the relative displacement of the wire guide irrespective of the change in vertical distance between the upper and lower wire guides.

Still another object of the invention is to provide such device in which taper machining is achievable within maximum inclination angle of the wire electrode, to thereby avoid interference between the wire electrode and machining liquid nozzles and avoid inadvertent wire cutting due to excessive friction of the wire with respect to the wire guides.

These and other objects of the invention will be attained by providing a taper machining device in a wire electrical discharge machining apparatus for effecting taper machining to a workpiece, the device including an upper wire guide, and a lower wire guide for supporting an wire electrode in its slanting extension, at least one of the upper and lower wire guides being movable in a horizontal plane, the wire electrode and the workpiece being relatively movable with providing a machining gap therebetween, the wire electrode having an upper bending point at the upper wire guide and a lower bending point at the lower wire guide, the improvement comprising regulating means for regulating movement of one of the upper and lower bending points within an imaginary conical body, an apex of the imaginary conical body being defined by a remaining one of the lower and upper bending points as a reference point and the apical angle of the apex being twice as large as an allowable maximum inclination angle of the wire electrode.

BRIEF DESCRIPTION OF THE DRAWINGS

In the drawings;

FIG. 4 is a flow chart which regulates a moving range of an upper wire bending point 12a within a movable range S.

DETAILED DESCRIPTION OF THE PREFERRED EMBODIMENT

Figure 1:
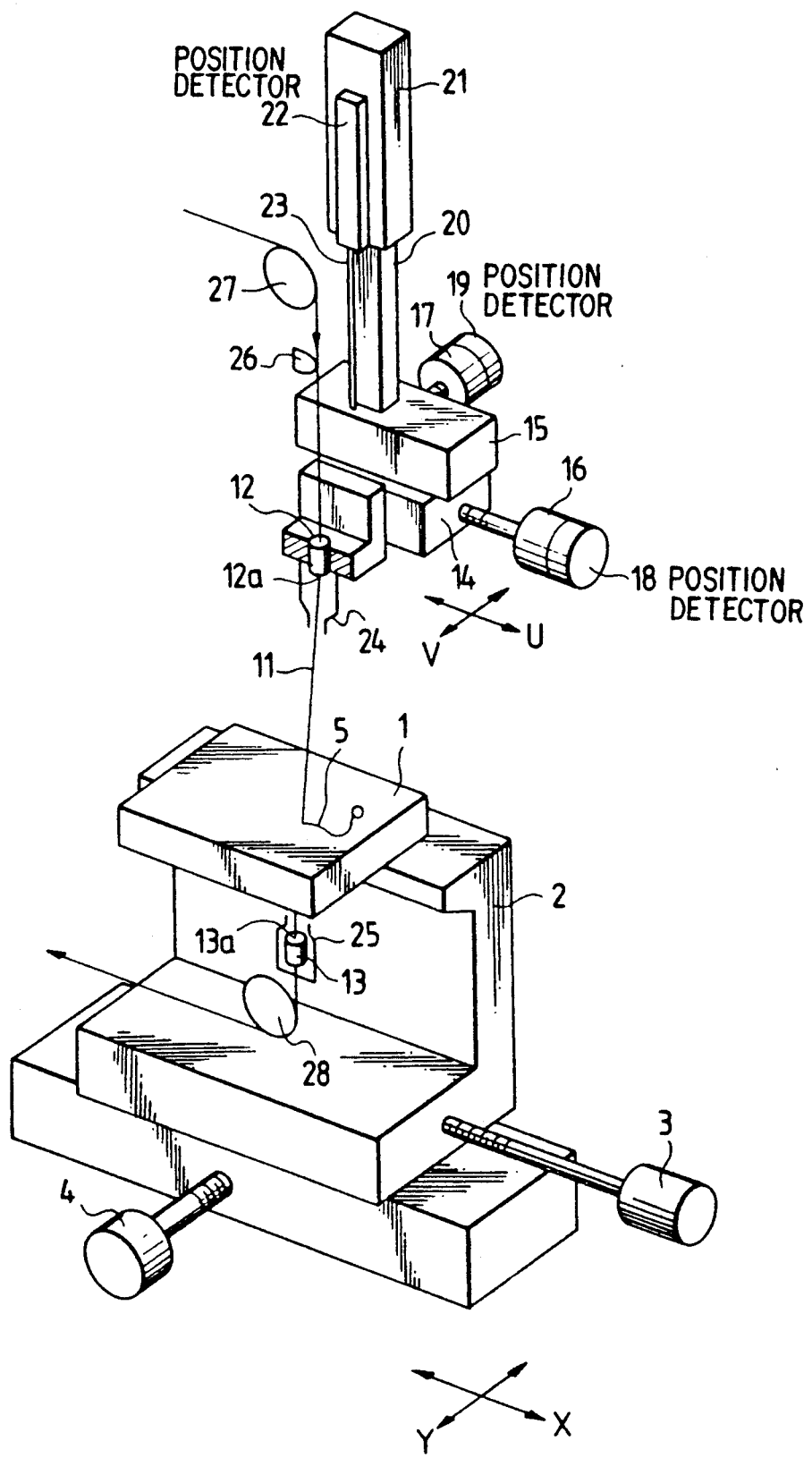
FIG. 1 is a perspective view showing a wire-electrical discharge machining device.

A wire-electrical discharge machining apparatus will first be described with reference to FIG. 1. A working table 2 is disposed to mount a workpiece 1 thereon. The table 2 is movable along a guide means (not shown) in a horizontal plane by means of X-axis servo motor 3 and Y-axis servo motor 4 relative to a wire electrode 11.

The wire electrode 11 is supported by upper and lower dies shaped wire guides 12 and 13, and the wire electrode 11 is travelled by way of the guide of the wire guides 12 and 13. The upper wire guide 12 is fixedly secured to a slider 14. The slider 14 is slidingly engageable with a guide groove formed in a slider base 15, and is connected to U-axis servo motor 16 and V-axis servo motor 17. Therefore, the movement of the slider 14 is controlled by these motors 16 and 17. Here, the U-axis and V- axis define a plane extending in parallel with a plane defined by the X and Y axes. The U-axis and V-axis servo motors 16 and 17 are provided with U-axis position detector 18 and V-axis position detector 19, respectively for detecting the position of the slider 14 in U and V-axis directions. Rotary encoders may be available as these detectors.

The lower wire guide 13 is stationarily provided at the position below the working table 1. In accordance with the movement of the slider 14 in the plane defined by the U-,V-axis, the wire electrode 11 is obliquely suspended or extended between the upper and lower guides 12 and 13 at which the wire 11 is bent to define upper and lower bending points 12a and 13a. The upper and lower wire bending points 12a and 13a define a maximum allowable wire inclination angle of 15 degrees with respect to a vertical line.

The slider base 15 is connected with a Z-axis slider 20 extending in a vertical direction which is guided by a Z-axis slider guide 21. With the structure, vertical position of the upper wire guide 12 fixed to the slider 14 is changeable in accordance with the vertical size of the workpiece 1. The Z-axis slider guide 21 is provided with a Z-axis position detector 22 for detecting the position of the slider in Z direction. A scale having a vernier or a linear encoder is available as the Z-axis position detector 22. Further, a plunger 23 functioning as a measuring piece is provided having a lower end in abutment with an upper surface of the slider base 15.

Nozzles 24 and 25 are integrally provided to the upper and lower wire guides 12 and 13, respectively, for injecting machining liquid therefrom. These nozzles 24,25 inject the liquid in the axial direction of the wire electrode 11 so as to generate an intensive machining liquid stream. A feeder 26 is provided in slide contact with the wire electrode, and a pulse form voltage is applied to the feeder 26 from a power source (not shown). Therefore, electrical discharge is provided between the obliquely extending wire electrode 11 and the workpiece 1 for the taper machining. Further, upper and lower guide rollers 27 and 28 are provided for guide travel of the wire electrode 11 under tension. A wire electrode feeding mechanism and a take-up mechanism are also provided. However, further explanation is negligible because their structures do not belong to a scope of the invention.

Figure 2:
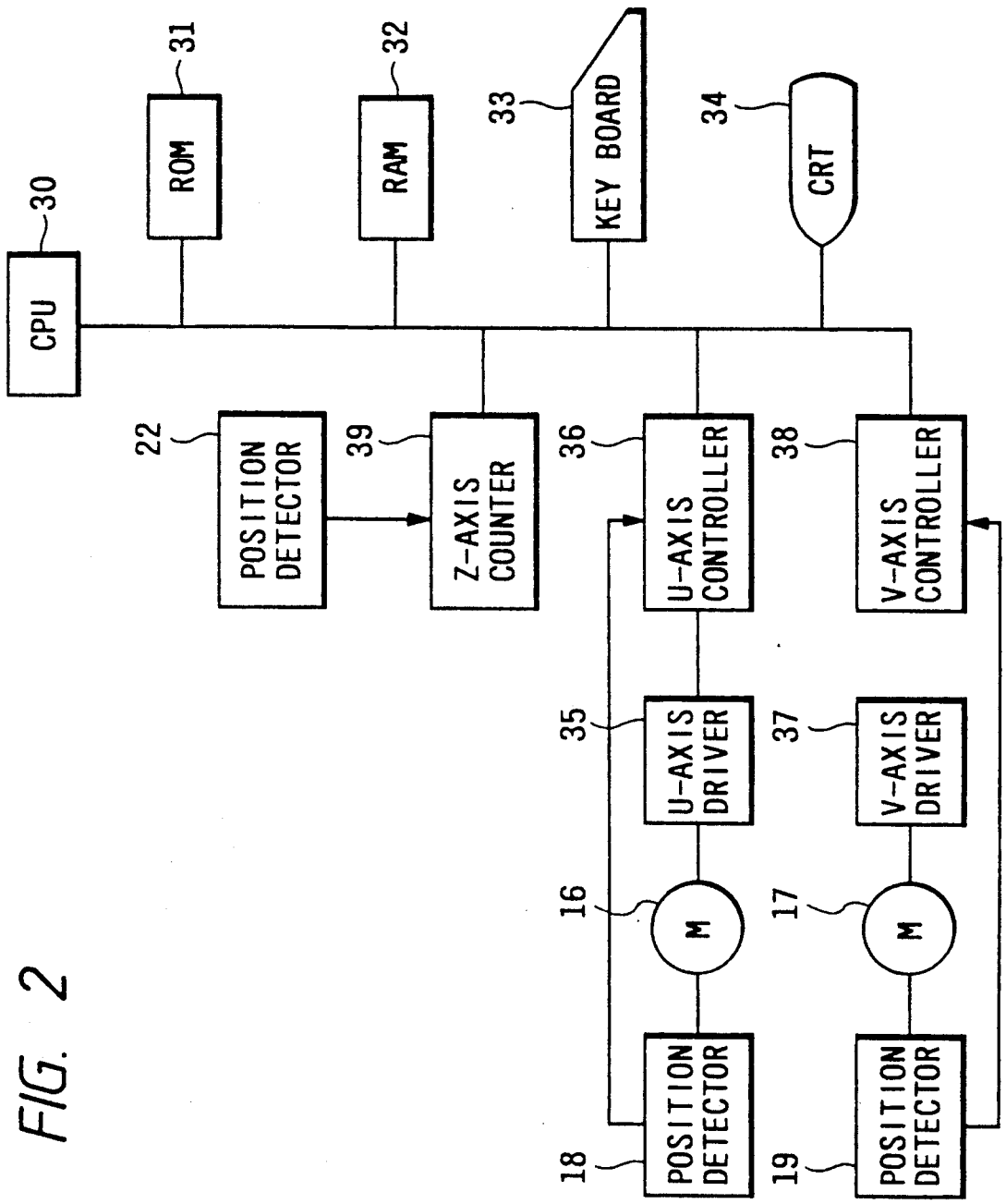
FIG. 2 is a block diagram showing a system for controlling movements of a slider and a slider base according to the present invention.

Next, control to the movements of the slider 14 and the slider base 15 will be described with reference to FIG. 2.

A processor unit (CPU) 30 is provided for controlling movement of the slider 14 in three dimensional direction. ROM 31, RAM 32, a key board 33 for inputting data into CPU, and a CRT display 34 are connected to the CPU 30. A U-axis driver 35 which drives the U-axis servo motor 16 is connected to the CPU 30 through a U-axis controller 36, and V-axis driver 35 which drives the V-axis servo motor 17 is also connected to the CPU 30 through a V-axis controller 38. Furthermore, the U-axis and V-axis position detectors 18 and 19 are connected to the U-axis and V-axis controllers 36 and 38, respectively for feed-backs of each of the detection signals to these controllers. The position detector 22 for detecting the position of the Z-axis slider 20 in Z-axis direction is connected to a Z-axis counter 39 which is connected to the CPU 30. The above described processor unit 30, memories 31, 32 etc. are assembled into a numerical control device which supervisedly controls the wire electrical discharge machining apparatus. Alternatively, the processor unit 30, etc. are assemboed into a single unit and the unit can be connected to a processor in the machining apparatus by way of a data bus.

Next, movable range S of the upper bending point 12a of the wire electrode in U and V directions is determined by the following formula in relation to the allowable maximum inclination angle α of the wire electrode provided that the lower bending point 13a serves as a reference or original point.

$$S = \sqrt{U^2 + V^2} \leq (a + b + Z) \tan \alpha \qquad (1)$$

where
U: relative displacement of the upper wire guide 12a and the lower wire guide 13a in U axis direction;
V: relative displacement of the upper wire guide 12a and the lower wire guide 13a in V axis direction;

Z: position in Z axis direction counting from an upper surface of the table 2 (a value detected by Z-axis position detector 22)

a: distance between the upper surface of the table 2 and lower bending point 13a;

b: distance between the position in Z axis direction and upper bending point 12a;

Therefore, the inclination angle $\theta$ of the wire electrode 12 extending between the upper and lower wire guides 12 and 13 does not exceed the allowable maximum inclination angle $\alpha$. Thus, the moving range of the upper bending point 12a relative to the lower bending point 13a (U=0, V=0) can be within the range defined by the above formula.

Figure 3:
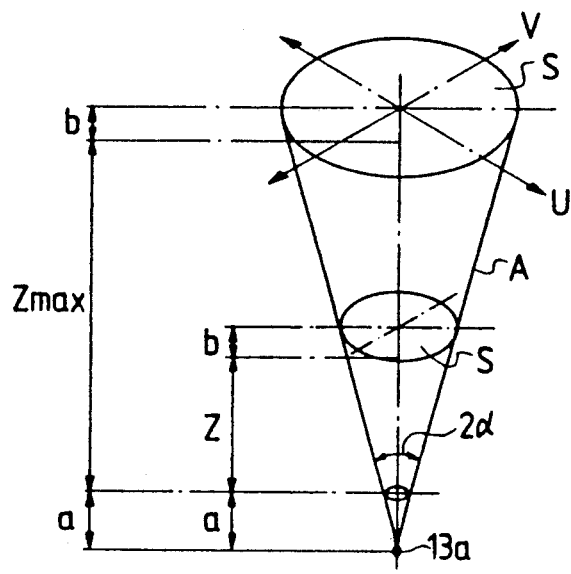
FIG. 3 is a view for description of determination in moving range of a bending point of a wire electrode.
Figure 5A:
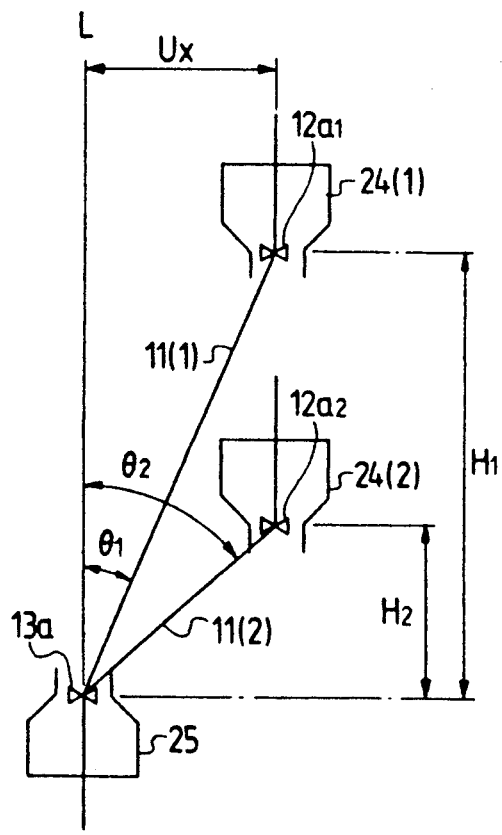
FIGS. 5(a) and 5(b) are schematic views for description of a conventional method for detecting overstroke of the wire electrode.
Figure 5B:
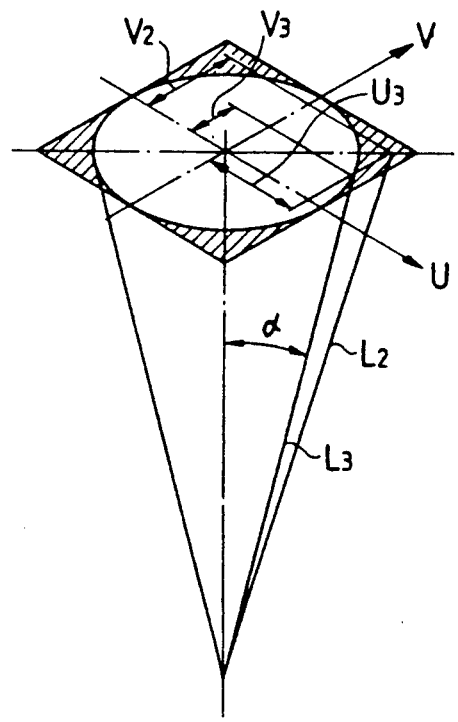

FIG. 3 is a diagrammatic illustration showing the change in the movable range S of the upper bending point 12a of the wire in accordance with the change in vertical position of the U-V plane detected by the Z-axis position detector 22. For practical purposes, the movable range is within an inverted conical body A having an apical angle $2\alpha$ at the lower wire bending point 13a.

FIG. 4 shows a flow chart showing a process for regulating the position of the upper bending point 12a into the movable range S calculated in accordance with the formula (1) in a programmed taper machining.

Firstly, a routine is started at step S100, and a position of the slider base 15 in the Z-direction is automatically detected by the Z-axis position detector 22 provided at the Z-axis slider guide 21 in step S101. Alternatively, the position of the slider base 15 in the Z-axis direction is manually inputted by the key board 33 and is stored in the memory 32. Subsequently, in step S102, a span length between the upper and lower guides 12 and 13, i.e., a+b+Z in the formula (1) is calculated in step S102. In step S103, "1" is initialized in item i and the routine proceeds into step S104 where a value of $U^2+V^2$ in the formula (1) is calculated in accordance with the moving signal in U and V axis directions sent from a machine program at the block number i. In step S105, computed is the maximum inclination angle $\theta$max of the wire electrode 11 at the block number i of the machine program during machining. This inclination angle $\theta$ is derived from the formula (1), such as:

$$\theta = \tan^{-1}\{\sqrt{U^2 + V^2}/(a + b + Z)\} \quad (2)$$

Subsequently, routine proceeds into step S106 where comparison is made between the above computed $\theta$max and the maximum allowable inclination angle $\alpha$ of the wire electrode 11. If $\theta$max is smaler than $\alpha$, the slider 14 is moved in U- and V-axis directions in accordance with the machining program and taper machining is effected to the workpieces. And the routine proceeds into step S108 where comparison is made between the item number i and the preset item number $i_{max}$. Number i is incremented to be equal to the item number $i_{max}$ in step S109, and the routine returns to step S104 so as to repeatedly perform the foregoing processings. On the other hand, if $\theta$max is larger than $\alpha$, movement in U- and V-axes is suspended in step S110 and an alarm is displayed in step S111 so as to terminate the routine.

The above described processing is available to a manual taper machining as well as a programmed taper machining. Further, in the above described embodiment, regulated is the tolerable moving range of the upper bending point of the wire electrode with respect to the lower bending point 13a thereof which is defined as a reference point. However, regulation of the inclination angle of the wire electrode within the allowable maximum inclination angle is also achievable by regulating the movable range of the lower bending point of the wire electrode with respect to the stationary upper bending point thereof.

In view of the foregoing, according to the present invention, relative moving range of the upper and lower bending points of the wire electrode is regulated within an imaginary conical body including the apex having apical angle twice as large as the allowable maximum inclination angle of the wire electrode. Therefore, relative movable range between the upper and lower bending points of the wire electrode is automatically determined regardless of the vertical distance therebetween, once the allowable maximum inclination angle of the wire electrode is determined. Consequently, taper machining is carried out at a desirable wire electrode inclination not exceeding the allowable maximum inclination angle. Accordingly, prevented is the interference of the wire electrode with the machining liquid injection nozzles, and cutting of the wire due to overtension which may be applied by the increase in frictional force at the sliding portions between the wire electrode and the upper and lowe wire guides.

While the invention has been described in detail and with reference to specific embodiment thereof, it would be apparent to those skilled in the art that various changes and modifications can be made therein without departing from the spirit and scope of the invention.

What is claimed is:

1. A taper machining device in a wire electrical discharge machining apparatus for affecting taper machining to a workpiece, comprising:

an upper wire guide and a lower wire guide for supporting a wire electrode in its slanting extension;

upper and lower nozzles integrally provided with the upper and lower wire guides, respectively, for ejecting a machining liquid to the workpiece; and regulating means;

said wire electrical discharge machining apparatus comprising a worktable extending in a first horizontal plane for mounting the workpiece thereon, a slider extending in a second horizontal plane parallel with said first horizontal plane, drive means for moving the slider in said second horizontal plane and in a vertical direction, the upper wire guide being provided at the slider;

at least one of the upper and lower wire guides and its integrally provided nozzle being horizontally movable, the wire electrode and the workpiece being relatively movable and providing a machining gap therebetween, the wire electrode having an upper bending point at the upper wire guide and a lower bending point at the lower wire guide, and said regulating means for regulating movement of one of the upper and lower bending points within an imaginary conical body, to thereby avoid mechanical interference between the wire electrode and the upper and lower nozzles, an apex of the imaginary conical body bending defined by a remaining one of the lower and upper bending points as a reference point and the apical angle of the apex being twice as large as an allowable maximum inclination angle of the wire electrode, said regulating means further comprising position detectors for detecting at least one of a vertical and horizontal position of the slider, the position detectors generating signals indicative of said positions, and control means connected to the position detectors for controlling the drive means in response to the signal from the position detectors, said control means comprising:
(a) means for detecting a vertical position of the slider;
(b) first means for computing a wire guide span length between the upper and lower wire guides in accordance with the detected vertical position of the slider;
(c) second means for computing a relative horizontal offsetting length between the upper and lower wire guides when the slider is at the vertical position;
(d) third means for computing a maximum inclination angle at the vertical position of the slider;
(e) comparison means for comparing the maximum inclination angle with the allowable maximum inclination angle of the wire electrode; and
(f) means for driving the drive means when the allowable maximum inclination angle is greater than the maximum inclination angle to change at least one of the parameters consisting of the vertical position of the slider and the relative horizontal offsetting length between the upper and lower wire guides.

2. The control means according to claim 1, further comprising:
means for comparing a current item number (i) with a predetermined item number ($i_{max}$), the comparison being made after driving the drive mans; and
means for incrementing the item number when the current item number (i) is lower than the predetermined item number ($i_{max}$) for repeatedly executing the computations by the second and third computing means and for executing the comparison by the comparison means.

3. A taper machining device in a wire electrical discharge machining apparatus for effecting taper machining to a workpiece by an electrical discharge from a wire electrode, comprising:
movable and stationary wire guides for supporting the wire electrode, a wire guide span length being defined between the wire guides;
a slider connected to the movable wire guide for moving the wire guide in a horizontal plane and in a vertical direction;
drive means for moving the movable slider in the horizontal plane and in the vertical direction;
means (22) for detecting a vertical position of the slider;
first computing means for computing the wire guide span length in accordance with the detected vertical position of the slider;
second computing means for computing a relative horizontal offsetting length between the upper and lower wire guides when the slider is at the vertical position;
third computing means for computing a maximum inclination angle at the vertical position of the slider;
comparison means for comparing the maximum inclination angle with an allowable maximum inclination angle of the wire electrode; and
means for driving the drive means when the allowable maximum inclination angle is greater than the maximum inclination angle to change at least one of the parameters consisting of the vertical position of the slider and the relative horizontal offsetting length between the upper and lower wire guides.

4. The taper machining device according to claim 3, further comprising means for comparing a current item number (i) with a predetermined item number ($i_{max}$), the comparison being made after driving the drive means; and means for incrementing the item number when the current item number (i) is lower than the predetermined item number ($i_{max}$) for repeatedly executing the computations by the second and third computing means and for executing the comparison by the comparison means.

* * * * *